(12) United States Patent
Yokota

(10) Patent No.: US 6,775,317 B1
(45) Date of Patent: Aug. 10, 2004

(54) METHOD FOR SPREAD SPECTRUM COMMUNICATIONS AND TRANSMITTER AND RECEIVER OF THE SAME

(75) Inventor: Yasuhiro Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/506,535

(22) Filed: Feb. 17, 2000

(30) Foreign Application Priority Data

Feb. 19, 1999 (JP) .......................................... 11-041783

(51) Int. Cl.$^7$ ............................................... H04B 1/69
(52) U.S. Cl. ...................... 375/130; 455/13.4; 455/574; 455/127.5
(58) Field of Search ................................ 375/130, 140, 375/146–147, 295, 316, 354, 367; 455/434–435, 456, 13.4, 23, 24, 42, 522, 524, 68, 69, 78, 572, 574, 575, 91, 95, 127.1, 130, 205, 234.2, 343.2–343.6, 561, 573, 453, 127.5; 370/278, 279, 282, 319, 320, 335, 342, 350, 441, 442, 515, 347, 458, 459, 321, 311, 337, 294

(56) References Cited

U.S. PATENT DOCUMENTS

| | | | |
|---|---|---|---|
| 5,027,428 A | * 6/1991 | Ishiguro et al. ............. | 340/7.35 |
| 5,203,020 A | * 4/1993 | Sato et al. .................... | 455/68 |
| 5,438,701 A | * 8/1995 | Yamada et al. .............. | 455/574 |
| 5,715,521 A | * 2/1998 | Fukasawa et al. ........... | 455/69 |
| 5,774,813 A | * 6/1998 | Jokinen ....................... | 455/574 |
| 5,802,101 A | 9/1998 | Maruyama | |
| 5,999,830 A | * 12/1999 | Taniguchi et al. ........... | 455/574 |
| 6,073,035 A | * 6/2000 | Witter ......................... | 455/574 |
| 6,085,096 A | * 7/2000 | Nakamura ................... | 455/456 |
| 6,088,409 A | * 7/2000 | Naruse ........................ | 375/354 |
| 6,104,937 A | * 8/2000 | Fujimoto ..................... | 455/574 |
| 6,205,333 B1 | * 3/2001 | Abe ............................ | 455/432 |
| 6,314,128 B1 | * 11/2001 | Bunker et al. .............. | 375/149 |
| 6,356,538 B1 | * 3/2002 | Li ................................ | 370/311 |
| 6,360,106 B1 | * 3/2002 | Besson ........................ | 455/561 |
| 6,463,050 B1 | * 10/2002 | Nagashima .................. | 370/347 |
| 6,463,307 B1 | * 10/2002 | Larsson et al. ............. | 455/574 |
| 6,480,476 B1 | * 11/2002 | Willars ........................ | 370/311 |
| 6,584,330 B1 | * 6/2003 | Ruuska ........................ | 455/574 |

FOREIGN PATENT DOCUMENTS

| | | |
|---|---|---|
| JP | 8-139638 | 5/1996 |
| JP | 10-094053 | 4/1998 |

* cited by examiner

*Primary Examiner*—Jean B. Corrielus
*Assistant Examiner*—Khanh Cong Tran
(74) *Attorney, Agent, or Firm*—Katten Muchin Zavis Rosenman

(57) ABSTRACT

A transmitter of a base station stops a spread modulation so as to transmit a free-line signal and a call-in signal to a mobile station in a wait state. A receiver of a mobile station which is in the wait state stops a despread modulation so as to receive the free-line signal and the call-in signal which are from the base station. The transmitter modulates, spreads, and then transmits and the receiver receives and then despreads and demodulates a control signal for connecting a line after transmitting and receiving the call-in signal are completed, a control signal for connecting the line when a call-out request is sent from the mobile station, and a talk signal and a talk completion control signal which are transmitted and received through the line.

7 Claims, 13 Drawing Sheets

FIG.2
PRIOR ART
(a) TRANSMITTING BASEBAND PROCESSING PART
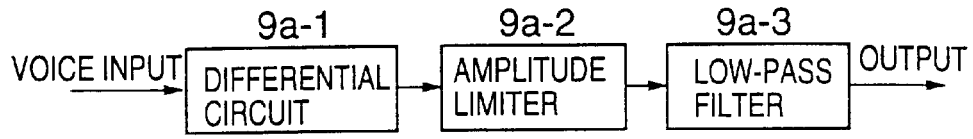
(b) BASEBAND MODULATING PART
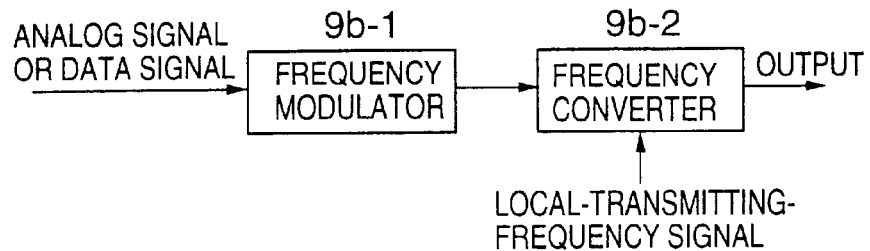
(c) SPREAD MODULATING PART
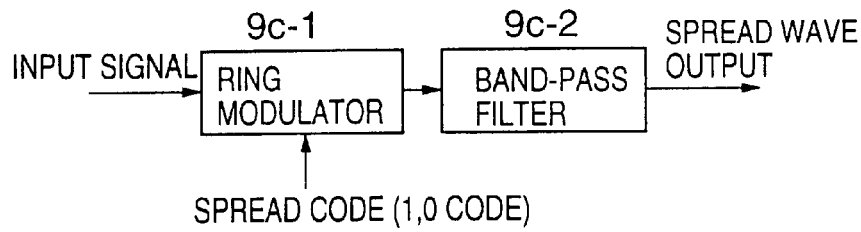
(d) LOCAL-TRANSMITTING-FREQUENCY GENERATING PART
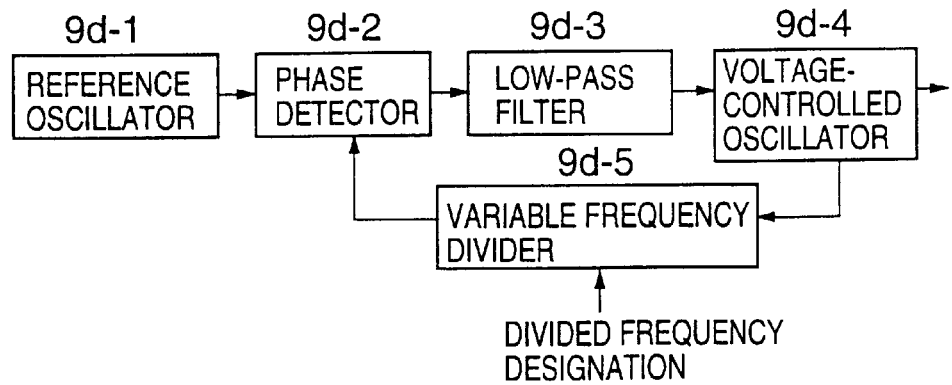

FIG.4
PRIOR ART
(a) HIGH-FREQUENCY AMPLIFYING PART
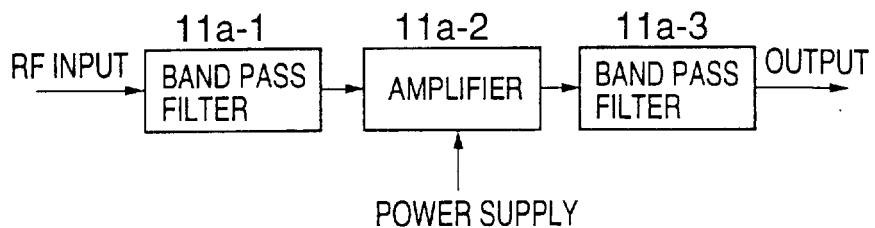
(b) DESPREAD MODULATING PART
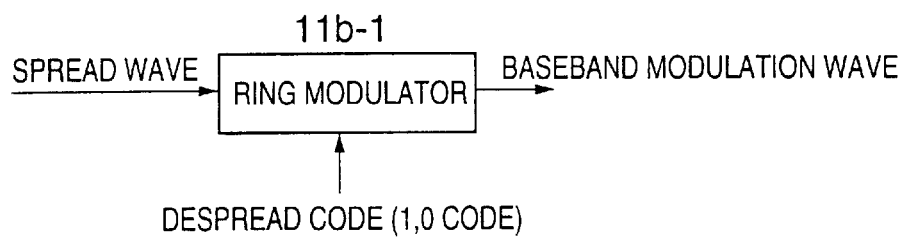
(c) BASEBAND DEMODULATING PART
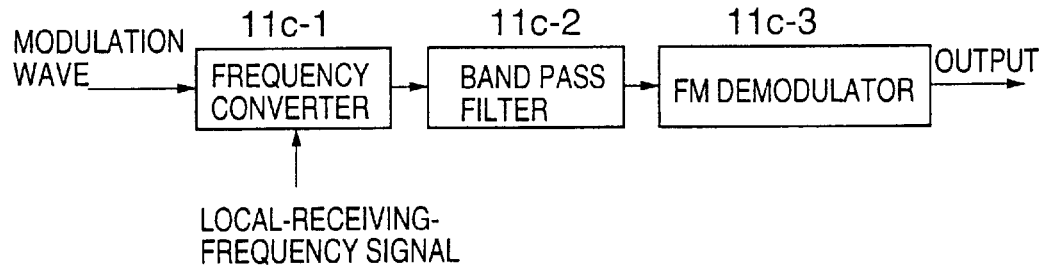
(d) RECEIVING BASEBAND PROCESSING PART
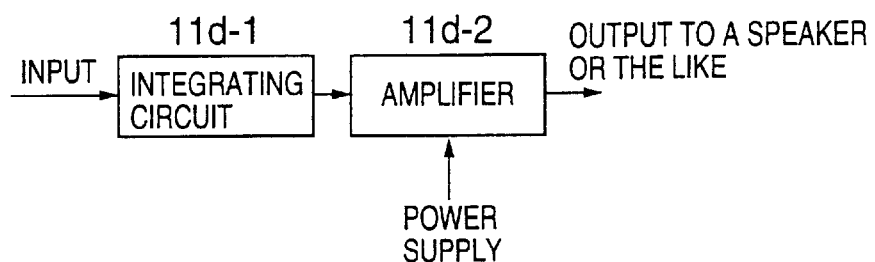

FIG.6 PRIOR ART

| SIGNAL TYPE | FREQUENCY(SPEED) | SPEED RATIO | REMARKS |
|---|---|---|---|
| ANALOG SIGNAL | 3 kHz MAXIMUM | 1 | INFORMATION SIGNAL OF VOICE OR THE LIKE |
| DIGITAL SIGNAL | 9.6 kbps | 1.6 | LOW-SPEED DIGITAL DATA |
| SPREAD SIGNAL | 3 M bps | 500 | ON/OFF OPERATION AT THIS SPEED |

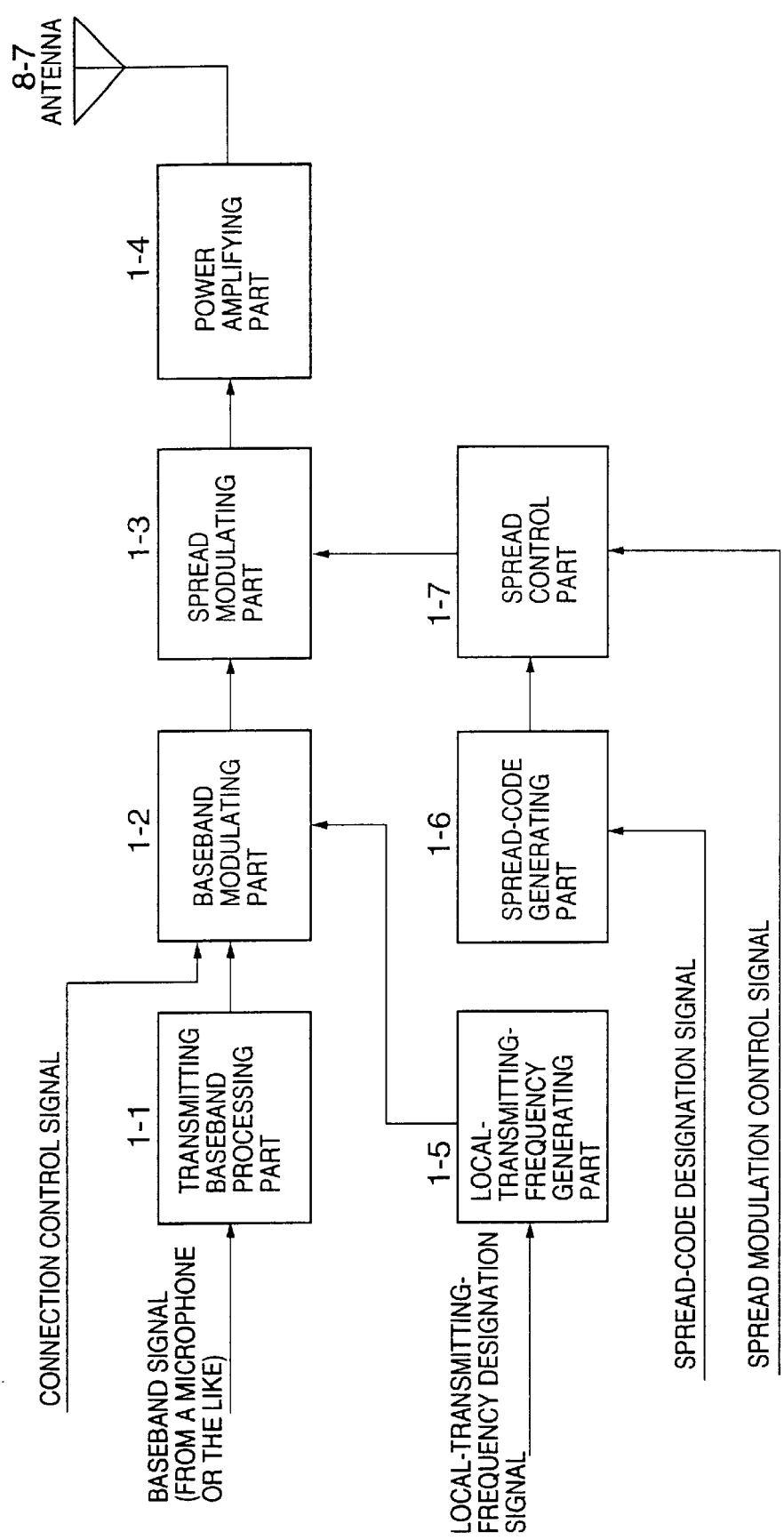

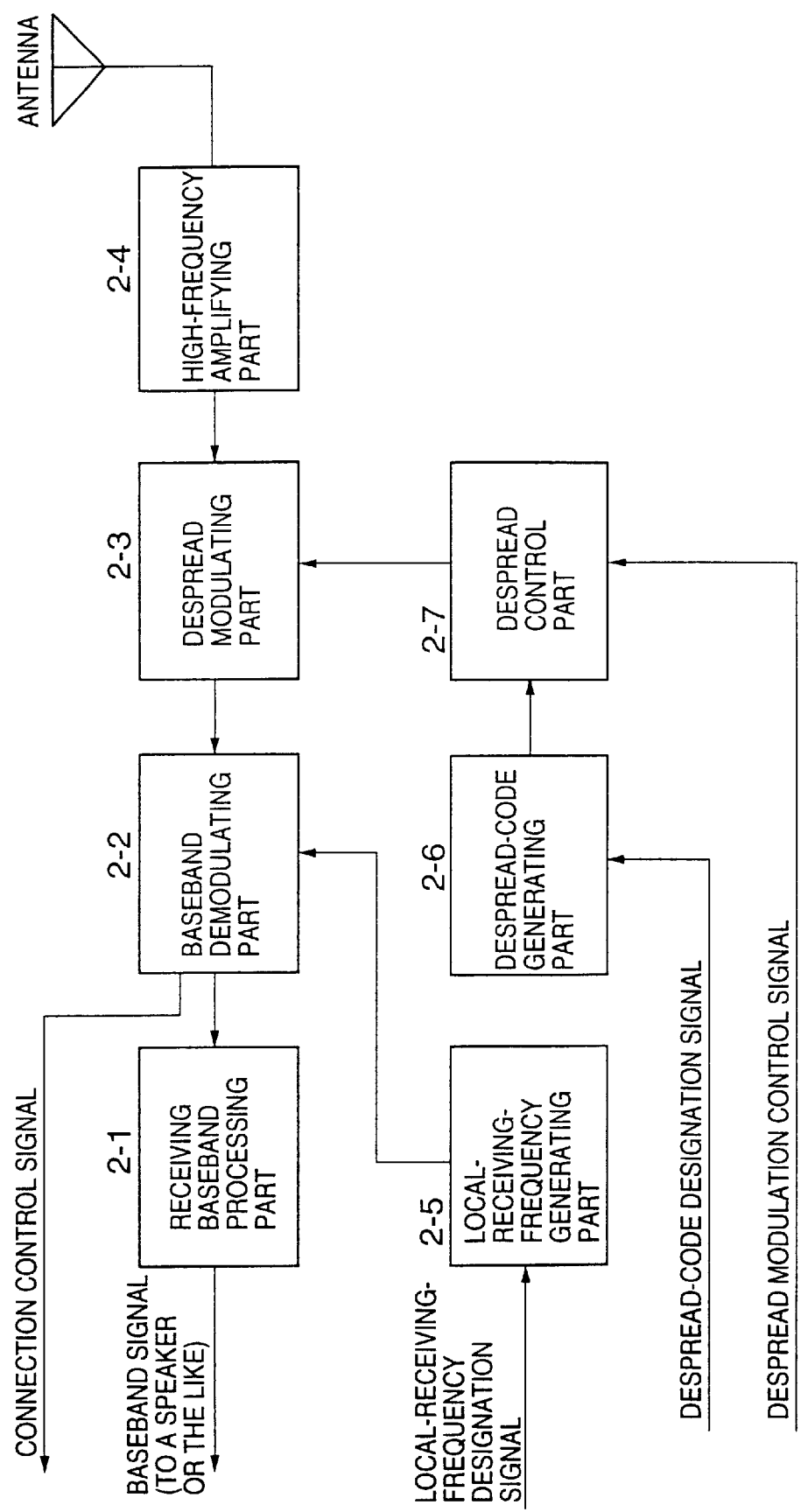

FIG.13

| | BASIC OPERATION | | INTERMITTENCE·DESPREAD OPERATION | | INTERMITTENCE·DESPREAD STOP | |
|---|---|---|---|---|---|---|
| | CURRENT | POWER | CURRENT | POWER | CURRENT | POWER |
| ANALOG PORTION | 5mA | 5mW | 0.5mA | 0.5mW | 0.5mA | 0.5mW |
| DIGITAL PORTION | 400mA | 1.2W | 40mA | 120mW | 0mA | 0mW |
| DIGITAL ANALOG PORTION | 10mA | 30mW | 2mA | 6mW | 2mA | 6mW |
| | | | TOTAL POWER | 127mW | TOTAL POWER | 6.5mW |

METHOD FOR SPREAD SPECTRUM COMMUNICATIONS AND TRANSMITTER AND RECEIVER OF THE SAME

BACKGROUND OF THE INVENTION

1. Field of the Invention

The present invention relates to a method for spread spectrum communications and to a transmitter and receiver thereof, and more particularly to a method for spread spectrum communications between a base station and a mobile station and to a transmitter of the base station and a receiver of the mobile station.

2. Description of the Related Art

FIG. 1 is a block diagram of a conventional transmitter used for spread spectrum communications. In this diagram, reference numeral 8-1 denotes a transmitting baseband processing part, 8-2 a baseband modulating part, 8-3 a spread modulating part, 8-4 a power amplifying part, 8-5 a local-transmitting-frequency generating part and 8-6 a spread-code generating part. FIG. 2 illustrates respective circuits of these functional parts of FIG. 1.

The transmitting baseband processing part 8-1 functions to adapt an analog voice signal to a modulation method of the baseband modulating part 8-2. In a case of performing a narrowband frequency modulation, as shown by (a) of FIG. 2, the transmitting baseband processing part 8-1 outputs a voice input signal by passing the voice input signal through a differential circuit $9a$-1, an amplitude limiter $9a$-2 and a low-pass filter $9a$-3. In the frequency modulation, the differential circuit $9a$-1 functions to improve talk articulation and the amplitude limiter $9a$-2 functions to limit frequency shifts.

In a case in which the baseband modulating part 8-2 performs a digital modulation, the transmitting baseband processing part 8-1 converts an analog input signal of, for example, voice or the like, into a digital signal, and then outputs the digital signal to the baseband modulating part 8-2.

The baseband modulating part 8-2 performs a carrier modulation according to a communication information signal of the voice, low-speed data or the like which is outputted from the transmitting baseband processing part 8-1. In a case in which the signal to be transmitted is a digital signal from the beginning like an individual connection control signal of each mobile station, the digital signal is directly inputted from a logic circuit portion (not shown) into the baseband modulating part 8-2. The baseband modulating part 8-2 modulates the inputted signal and then outputs the modulated signal to the spread modulating part 8-3.

Additionally, in a case of outputting, for example, an FM (i.e., frequency modulation) signal of 150 MHz, in the baseband modulating part 8-2, as shown by (b) of FIG. 2, a frequency modulator $9b$-1 generates an FM wave of several MHz to several tens of MHz by the input information signal of the voice, data or the like. Then a frequency converter $9b$-2 uses the FM wave of several MHz to several tens of MHz and a signal of a local transmitting frequency of 140 MHz to output a narrowband FM signal of 150 MHz.

In a case of performing a digital modulation such as FSK or the like, the baseband modulating part 8-2 shifts a transmitting frequency to a plus direction or a minus direction according to the digital input signal of the voice, data, or the like.

The spread modulating part 8-3 spreads the signal (for example, the FM wave of 150 MHz, or the like) which has been modulated by a spread code. Hence, the modulation performed in the spread modulating part 8-3 is not a modulation by the information signal.

In the spread modulating part 8-3, as shown by (c) of FIG. 2, a ring modulator $9c$-1 spreads and modulates an input signal by the spread code consisting of a string of binary code (1, 0), and outputs a spread wave of 150 MHz via a bandpass filter $9c$-2.

The power amplifying part 8-4 amplifies the signal outputted from the spread modulating part 8-3 by a power amplifier thereof consisting of one stage or a plurality of stages, and then supplies an power-amplified radio-frequency signal to a transmitting antenna 8-7.

The local-transmitting-frequency generating part 8-5, as shown by (d) of FIG. 2, is a PLL synthesizer which consists of a reference oscillator $9d$-1, a phase detector $9d$-2, a low-pass filter $9d$-3, a voltage-controlled oscillator $9d$-4 and a variable frequency divider $9d$-5. The local-transmitting-frequency generating part 8-5 generates a local-transmitting-frequency signal corresponding to an inputted local-transmitting-frequency designation signal as a frequency division of the PLL synthesizer, and sends the local-transmitting-frequency signal to the frequency converter $9b$-2 of the baseband modulating part 8-2.

In the local-transmitting-frequency generating part 8-5, the phase detector $9d$-2 detects a phase difference between a signal from the reference oscillator $9d$-1 and a signal from the variable frequency divider $9d$-5, and, via the low-pass filter $9d$-3, inputs the two signals into the voltage-controlled oscillator $9d$-4.

A signal outputted from the voltage-controlled oscillator $9d$-4 is inputted into the variable frequency divider $9d$-5, in which a frequency of the output signal is divided according to a frequency division designated by the local-transmitting-frequency designation signal and then is transmitted to the phase detector $9d$-2.

The spread-code generating part 8-6 generates the spread code designated by a spread-code designation signal and outputs the spread code to the spread modulating part 8-3. The spread code is, for example, a string of binary code (1, 0) of 3 Mbs, and is distributed into each of mobile stations so as to identify each mobile station and spread a transmitting signal sent thereto. The length of the code string is related to an identification code and the length of a bit is related to a width of the spread.

The baseband modulating part 8-2 modulates the communication information signal of the voice, data or the like at a low speed. The spread modulating part 8-3 spreads the transmitting signal according to the identification code of each of the mobile stations and performs a modulation at a middle/high speed.

FIG. 3 is a block diagram illustrating a conventional receiver used for spread spectrum communications. In this diagram, reference numeral 10-1 denotes a receiving baseband processing part, 10-2 a baseband demodulating part, 10-3 a despread modulating part, 10-4 a high-frequency amplifying part, 10-5 a local-receiving-frequency generating part and 10-6 a despread-code generating part. FIG. 4 illustrates respective circuits of these functional parts of FIG. 3.

An antenna 10-7 receives a radio signal and inputs the radio signal into the high-frequency amplifying part 10-4 in which, as shown by (a) of FIG. 4, the inputted radio signal is amplified by passing through a bandpass filter $11a$-1, an amplifier 11a-2 and a bandpass filter 11a-3 and then is outputted to the despread modulating part 10-3. The amplifier 11a-2 is formed by a stage of an amplifying circuit or by a plurality of stages of the amplifying circuit.

The despread modulating part 10-3 despreads a spread wave outputted from the high-frequency amplifying part 10-4 so as to shrink the spread wave back to its original signal prior to spreading. In the despread modulating part 10-3, as shown in (b) of FIG. 4, a ring modulator 11b-1 despreads the spread wave of, for example, 3 Mbps, by a despread code formed by a string of binary code (1, 0) so as to converge the spread wave to become a narrowband FM wave of 150 MHz (i.e., in a case in which the narrowband FM has been used).

The baseband demodulating part 10-2 demodulates a basic modulation wave outputted from the despread modulating part 10-3 to produce a baseband signal and outputs this communication information signal of the voice, data or the like to the receiving baseband processing part 10-1. In a case in which the signal to be received by the receiving baseband processing part 10-1 is a digital data signal from the beginning like the individual connection control signal of each mobile station, the digital signal is demodulated and outputted to a logic circuit (not shown).

In a case of demodulating the narrowband FM wave of 150 MHz, in the baseband demodulating part 10-2, as shown by (c) of FIG. 4, a frequency converter 11c-1 uses a local-receiving-frequency signal of 140 MHz to change the frequency of the narrowband FM wave of 150 MHz so that a bandpass filter 11c-2 takes out a signal of 10 MHz and outputs the signal of 10 MHz to an FM demodulator (i.e., a discriminator) 11c-3 in which the signal is demodulated back to the baseband signal.

In a case of demodulating a digital modulated signal, for example, a FSK modulated signal, the baseband demodulating part 10-2 demodulates the digital modulated signal from the frequency signal which has shifted to the plus direction or the minus direction.

The receiving baseband processing part 10-1 processes and outputs the information signal of the voice, data or the like according to whether the baseband demodulating part 10-2 outputs an analog signal or a digital signal.

In a case in which of the output signal is an analog signal, in the receiving baseband processing part 10-1, as shown by (d) of FIG. 4, an integrating circuit 11d-1 integrates the analog signal and output an integrated signal to an amplifier 11d-2, and the amplifier 11d-2 amplifies the integrated signal and outputs an integrated-and-amplified signal to, for example, a speaker or the like. The integrating circuit 11d-1 functions to improve the talk articulation together with the differential circuit 9a-1 of the transmitting side.

In a case in which the output signal is a digital signal, the receiving baseband processing part 10-1 performs a digital-into-analog conversion so as to convert a voice signal or the like into an analog signal and outputs the analog signal.

The local-receiving-frequency generating part 10-5 has the identical constitution with the above-mentioned local-transmitting-frequency generating part 8-5, wherein the local-receiving-frequency signal corresponding to the local-receiving-frequency designation signal is generated and transmitted to the frequency converter 11c-1 of the baseband demodulating part 10-2. The despread-code generating part 10-6 generates a despread code which is identical with the above-mentioned spread code and transmits the despread code to the despread modulating part 10-3.

However, even though the spread spectrum communications can make better use of the frequency, a high speed for processing signals is needed during the spreading and despreading thereof. For this reason, a large-type battery is required to provide sufficient power. As a result, it is difficult to realize a small-size and light-weight mobile station.

The mobile station may perform receiving intermittence so as to reduce the power consumption. However, if the receiving intermittence is too long, a delay may occur in a call connection for a call-in. Hence, there is a limitation on reduction of the power consumption by the receiving intermittence.

A CMOS logic IC consumes little power when an operation speed is low, but as the operation speed increases, the consumed power increases. The consumed power $P_r$ can take the form $$P_r = (C_L + C_{pd}) \cdot f \cdot V_{cc}^2 \qquad (1)$$

where $C_L$ denotes a load capacity, $C_{pd}$ denotes an internal equivalent capacity, f denotes an operating frequency, and $V_{cc}$ denotes a supply voltage.

FIG. 5 is a graph for illustrating characteristics of an operating frequency and a consumed current of the CMOS logic IC. The consumed current is in direct proportion to the operating frequency. The consumed current represents a consumed current per gate. Since a logic circuit portion used by a control circuit of a digital radio machine is formed by several tens of thousands of circuits, the consumed current of the logic circuit portion occupies the majority of the overall consumed current.

As shown in FIG. 5, the consumed current of the logic circuit portion is related to an operation speed. In other words, the operation speed is in proportion to the consumed current. FIG. 6 shows an example of respective frequencies (speeds) and speed ratios of an analog voice signal, a low-speed baseband digital modulation signal and a middle-speed spread signal. With respect to the frequencies (speeds) which influence the consumed current, the analog voice signal and the spread signal cannot be simply compared with each other since the ratio thereof is 500.

With respect to the consumed power, for example, if operating at 3 MHz per gate consumes 5 V and 0.4 mA (2 mW), then a circuit block including 1000 gates will consumes 400 mA. In a case in which an intermittence in which a ratio of receiving operation "ON" to receiving operation "OFF" is 1:9, a consumed current is 40 mA. On the other hand, an analog amplifier can be operated by 1 V, 1 mA (1 mW) even in a case of a high frequency of 150 MHz.

Thus, the baseband processing part and baseband modulation and demodulating parts work at a low speed, and therefore each consumes very little current, whereas the spreading and the despreading work at a high speed and each consumes a large current. Hence, in order to reduce the consumed power of the mobile station, it is important to reduce the consumed power of the spreading and the despreading.

The mobile station has much more wait time than occupation time. Consumed current in the wait time greatly influences the life of the battery, namely, available time of the mobile station. Further, since a receiver of the mobile station used for the spread spectrum communications has to perform the despread modulation all the time even during the wait time, it is difficult to reduce the consumed current.

SUMMARY OF THE INVENTION

It is a general object of the present invention to provide a method for spread spectrum communications and a transmitter and receiver of the method, in which the above disadvantages are eliminated.

A more specific object of the present invention is to provide a method for spread spectrum communications between a base station and a mobile station and to a transmitter of the base station and a receiver of the mobile station.

The above objects of the present invention are achieved by a method for spread spectrum communications between a base station and a mobile station, comprising the steps of:

(a) controlling a transmitter of the base station to stop a spread modulation so as to transmit a free-line signal and a call-in signal to the mobile station which is in a wait state of waiting to receive the signals;

(b) controlling a receiver of the mobile station to stop a despread modulation in the wait state so as to receive the free-line signal and the call-in signal from the base station; and (c) controlling the transmitter to modulate, spread, and then transmit and the receiver to receive and then despread and demodulate:

a control signal for connecting a line after transmitting and receiving the call-in signal are completed;

a control signal for connecting the line when a call-out request is sent from the mobile station; and a communication information signal and a communication-completion control signal which are transmitted and received through the line.

The above objects of the present invention are achieved by a transmitter of a base station for spread spectrum communications, comprising:

a baseband modulating part;

a spread modulating part;

a spread-code generating part; and a spread control part;

wherein the spread control part stops a spread modulation so as to transmit a free-line signal and a call-in signal which are outputted from the baseband modulating part, and controls the spread modulating part so as to spread modulate and then transmit to a mobile station which is in a wait state:

a control signal for connecting a line after transmitting the call-in signal is completed;

a control signal for connecting the line when a call-out request is sent from the mobile station; and a communication information signal and a communication-completion control signal which are to be transmitted through the line.

The transmitter may be configured such that the baseband modulating part is a constitution capable of performing a narrowband frequency modulation, and the spread modulating part is a constitution capable of performing a direct sequence spread modulation by the spread code.

The transmitter may be configured such that the baseband modulating part is a constitution capable of performing a digital phase modulation, and the spread modulating part is a constitution capable of performing a direct sequence spread modulation by the spread code.

The above objects of the present invention are achieved by a receiver of a mobile station for spread spectrum communications, comprising:

a baseband demodulating part;

a despread modulating part;

a despread-code generating part; and a despread control part;

wherein, when the mobile station is in a wait state, the despread control part stops a despread modulation so as to receive a free-line signal and a call-in signal which are transmitted from a base station, and controls the despread modulating part so as to receive and then despread modulate:

a control signal for connecting a line after receiving the call-in signal is completed;

a control signal for connecting the line when a call-out request is sent from the mobile station; and a communication information signal and a communication-completion control signal which are transmitted through the line.

The receiver may be configured such that the baseband demodulating part is a constitution capable of demodulating a narrowband FM signal and the despread modulating part is a constitution capable of performing a direct sequence despread modulation by a despread code.

The receiver may be configured such that the baseband demodulating part is a constitution capable of demodulating a digital phase modulated signal, and the despread modulating part is a constitution capable of performing a direct sequence despread modulation by the despread code.

As mentioned above, according to the resent invention, in a wait time, the mobile station stops the despread modulation and waits to receive the free-line signal and the call-in signal which are transmitted from the base station. Only during the talk and in the location registration, does the mobile station perform the despread modulation and exchange signals with the base station. Hence, since the consumed power in the wait time can be drastically reduced and the consumed current of a battery can be reduced, it is easy to ensure a long use of the battery and a small-size and produce light-weight mobile station.

BRIEF DESCRIPTION OF THE DRAWINGS

Other objects, features and advantages of the present invention will become more apparent from the following detailed description when read in conjunction with the accompanying drawings, in which:

FIG. 2 is a diagram illustrating respective circuits of functional parts of the conventional transmitter used for the spread spectrum communications;

FIG. 4 is a diagram illustrating respective circuits of functional parts of the conventional receiver used for the spread spectrum communications;

FIG. 6 is a table of data on frequencies (speeds) and ratios of an analog voice signal, a baseband digital modulation signal and a spread signal thereof.

FIG. 7 is a block diagram of a transmitter used in spread spectrum communications according to the present invention;

FIG. 8 is a block diagram of a receiver used in spread spectrum communications according to the present invention;

FIG. 13 shows a table of data on consumed current and consumed power of each block of a receiver of the mobile station according to the present invention;

DETAILED DESCRIPTION OF THE PREFERRED EMBODIMENTS

Figure 1:
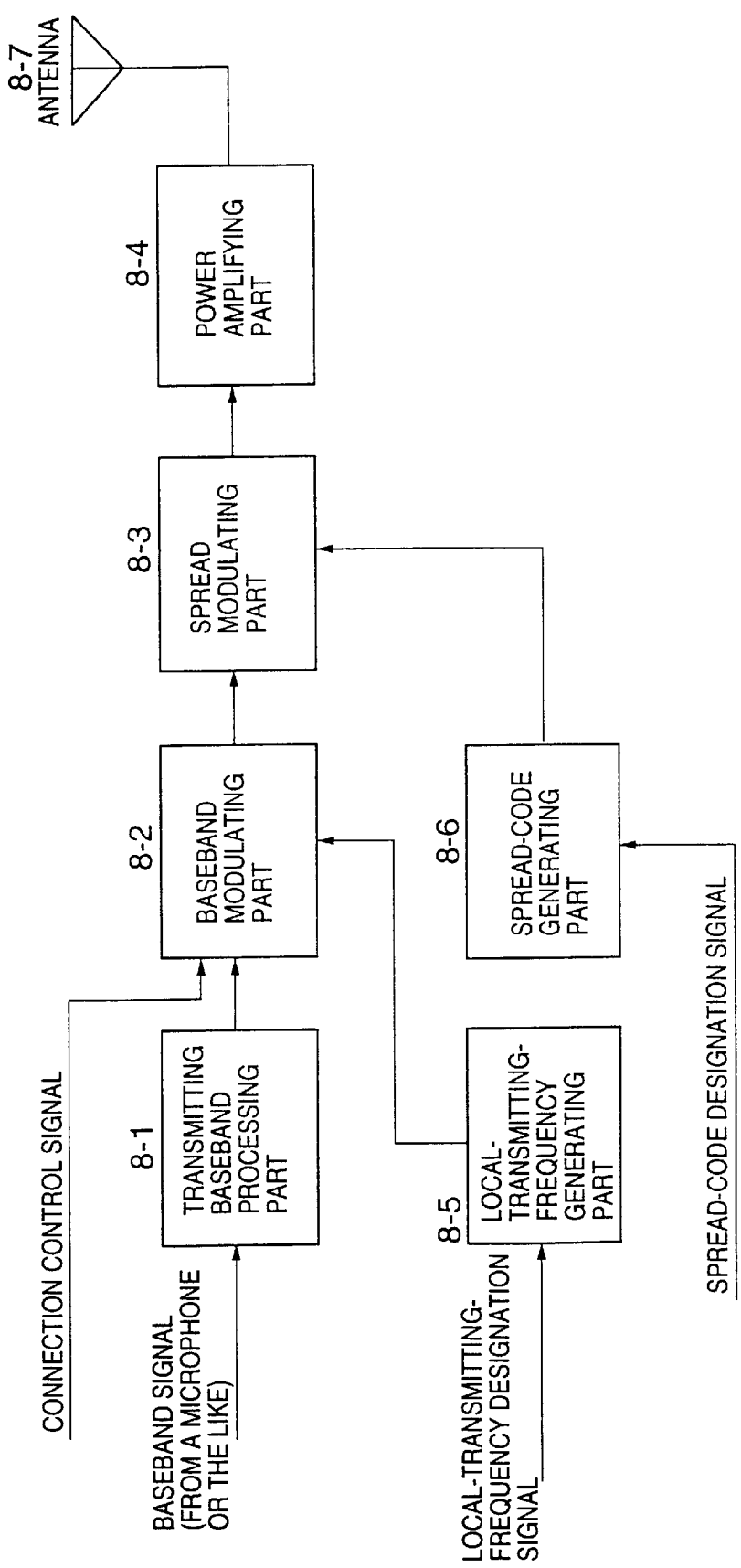
FIG. 1 is a block diagram of a conventional transmitter used for spread spectrum communications.

FIG. 7 is a block diagram of a transmitter used for spread spectrum communications according to the present invention. FIG. 8 is a block diagram of a receiver used for spread spectrum communications according to the present invention.

In FIG. 7, reference numeral 1-1 denotes a transmitting baseband processing part, 1-2 a baseband modulating part, 1-3 a spread modulating part, 1-4 a power amplifying part, 1-5 a local-transmitting-frequency transmitting-frequency generating part, 1-6 a spread-code generating part and 1-7 a spread control part.

In FIG. 8, reference numeral 2-1 denotes a receiving baseband processing part, 2-2 a baseband demodulating part, 2-3 a despread modulating part, 2-4 a high-frequency amplifying part, 2-5 a local-receiving-frequency generating part, 2-6 a despread-code generating part and 2-7 a despread control part.

In the above-mentioned two diagrams, a connection control signal is a string of data of an individual connection control signal of each mobile station or the like. A frequency designation signal is a string of data for designating a frequency division of a PLL synthesizer. A spread/despread-code designation signal is a string of data for designating a spread/despread code in transmitting or receiving. A spread/despread control signal is a signal of 1 or 0 (ON/OFF) for controlling stop/operation of the spread modulating part 1-3 or the despread modulating part 2-3.

In the present invention, the transmitting baseband processing part 1-1, the baseband modulating part 1-2, the power amplifying part 1-4 and the local-transmitting-frequency generating part 1-5 of the transmitter respectively have the identical constitutions with those corresponding parts of the conventional transmitter of FIG. 1. Therefore, a description thereof is omitted.

Figure 3:
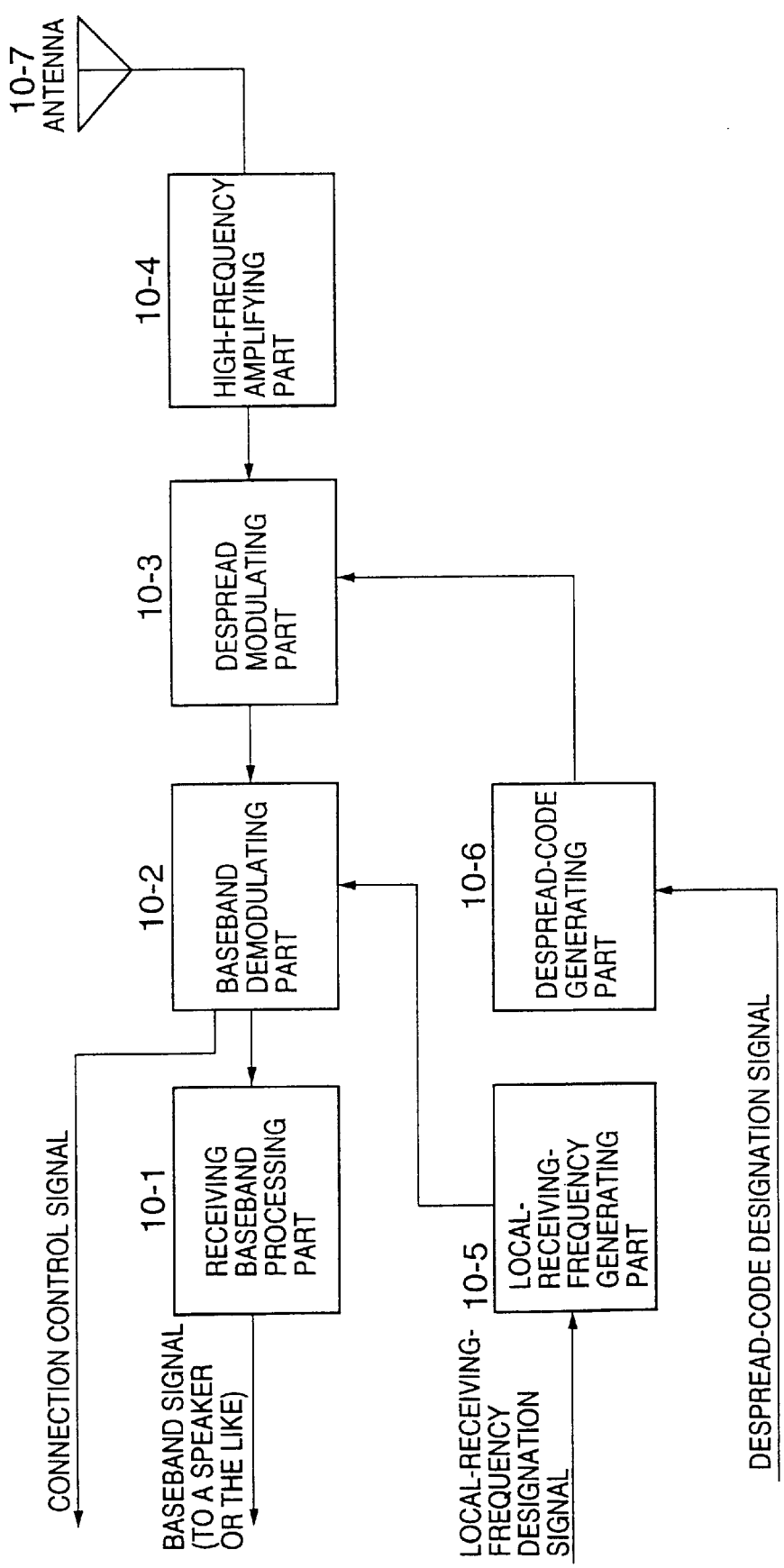
FIG. 3 is a block diagram of a conventional receiver used for the spread spectrum communications.
Figure 5:
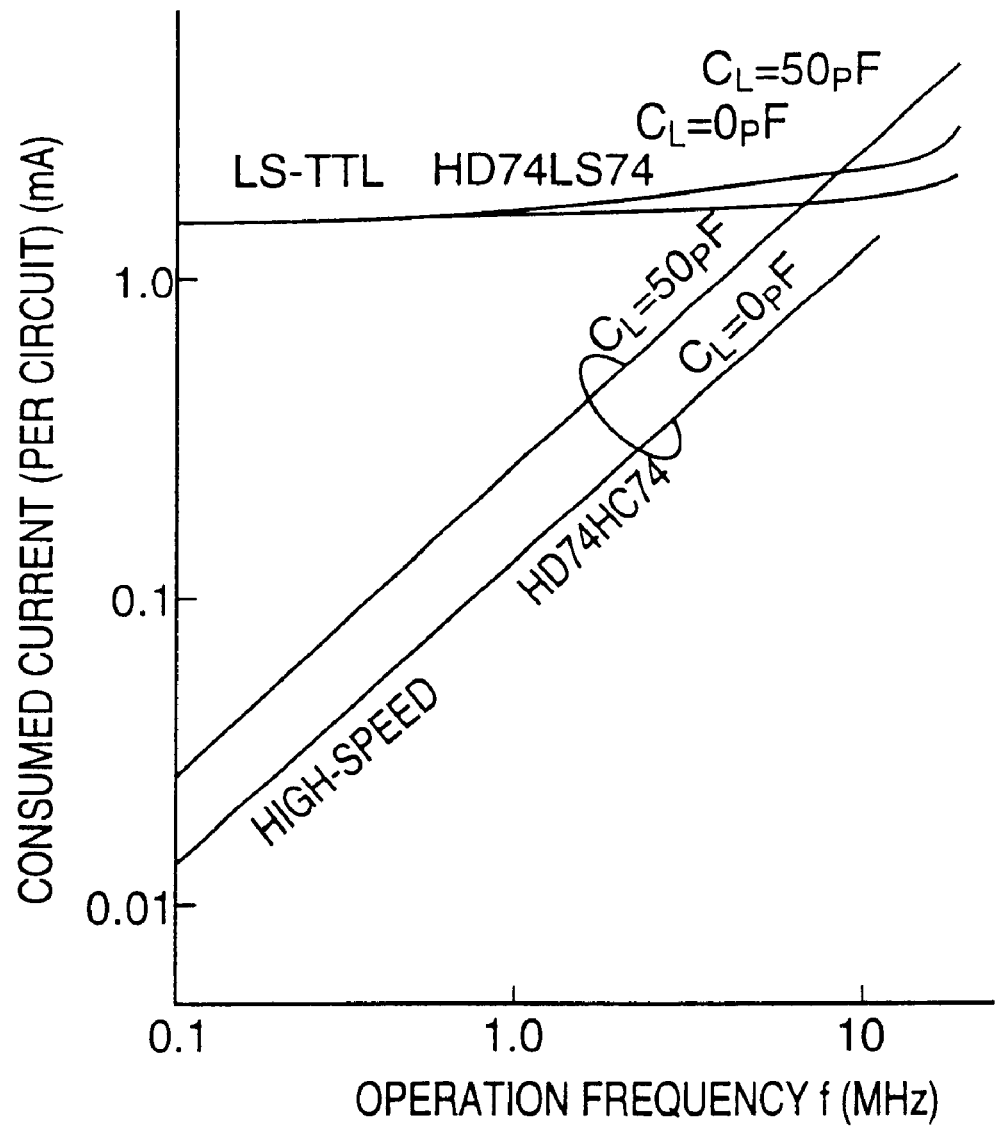
FIG. 5 is a graph showing characteristics of operating frequency and consumed current of a CMOS logic IC.

In the present invention, the receiving baseband processing part 2-1, the baseband demodulating part 2-2, the high-frequency amplifying part 2-4 and the local-receiving-frequency generating part 2-5 of the receiver respectively have the identical constitutions with those corresponding parts of the conventional receiver of FIG. 3. Therefore, a description thereof is omitted.

In a free-line state, the transmitter of the base station stops a spread modulation of the spread modulating part 1-3 by the spread control part 1-7 and transmits a free-line signal by the baseband modulation signal. In a call-in state, the transmitter of the base station stops the spread modulation of the spread modulating part 1-3 by the spread control part 1-7 and transmits a call-in signal.

In a wait state, the receiver of the mobile station stops a despread modulation of the despread modulating part 2-3 by the despread control part 2-7 so as to wait to receive the free-line signal and the call-in signal which are transmitted from the base station.

Thus, during a time for waiting to receive the free-line signal and the call-in signal, the receiver of the mobile station stops logic circuits of the despread modulating part 2-3 which are operated at a high speed so as to receive the signals by the low-speed baseband signal. As a result, the power consumption of the mobile station can be reduced.

Figure 9A:
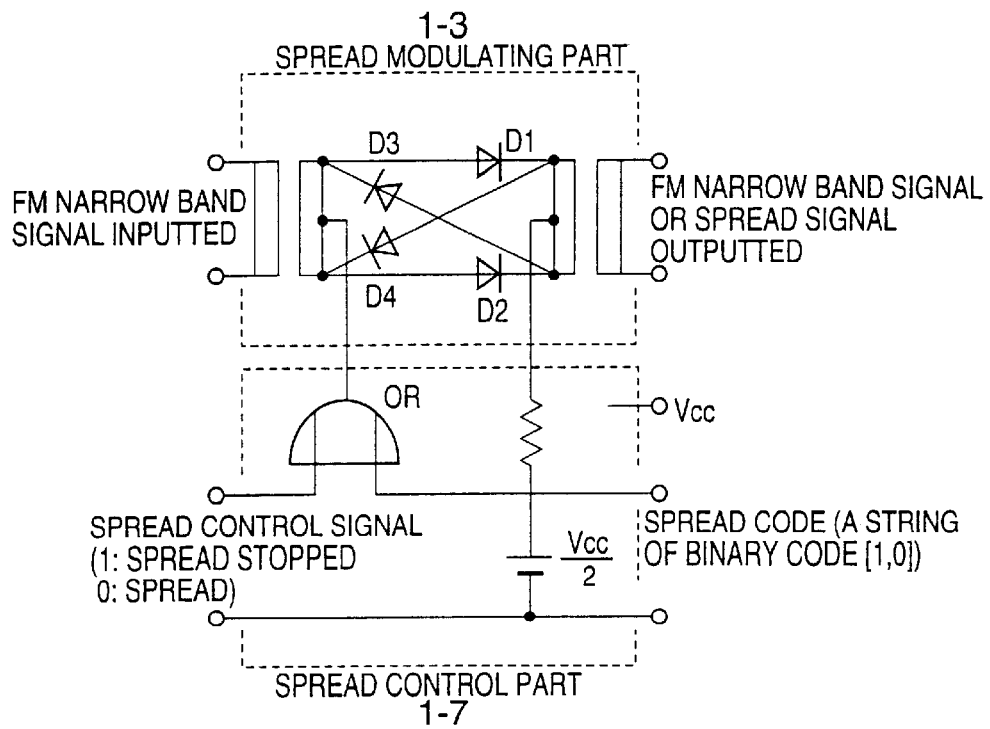
FIG. 9a is a view showing a constitution of a spread control part according to the present invention.
Figure 9B:
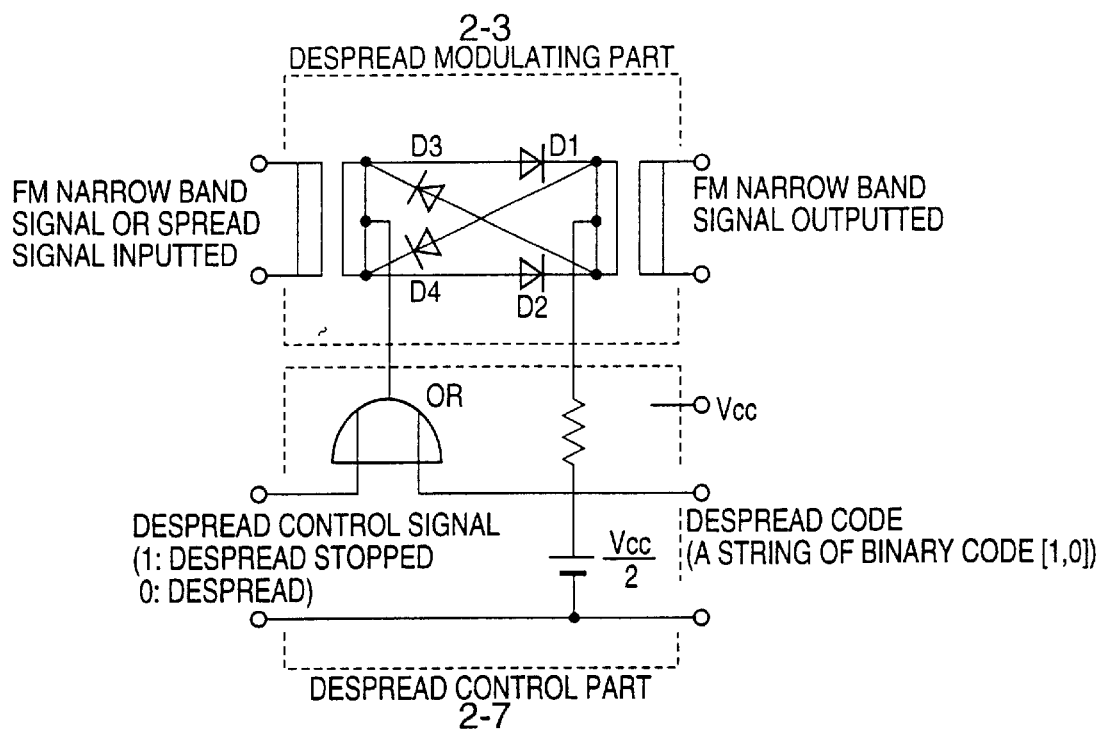
FIG. 9b is a view showing a constitution of a despread control part according to the present invention.

FIG. 9a shows the spread modulating part 1-3 and the spread control part 1-7 of the transmitter according to the present invention. FIG. 9b shows the despread modulating part 2-3 and the despread control part 2-7 of the receiver according to the present invention.

The spread modulating part 1-3 and the despread modulating part 2-3 each include a ring modulator consisting of diodes D1 to D4. The spread control part 1-7 and the despread control part 2-7 each include an OR gate for controlling transmission of the respective spread code or despread code which is inputted from one end of the OR gate. The spread control signal or the despread control signal is inputted from the other end of the OR gate.

With respect to the transmitter, when the spread control signal is "1", an output of the OR gate becomes a fixed value "1", and the diodes D1 and D2 become continuous all the time. As a result, an FM narrowband signal is inputted into the spread modulating part 1-3 and then outputted therefrom without being spread.

When the spread control signal is "0", the output of the OR gate varies with the spread code. In a case in which the output of the OR gate is "1", the diodes D1 and D2 become continuous, and the FM narrowband signal is inputted into the spread modulating part 1-3 and then outputted therefrom without a phase inversion, whereas in a case in which the output of the OR gate is "0", the diodes D3 and D4 become continuous, and the FM narrowband signal is inputted into the spread modulating part 1-3 and then outputted therefrom with the phase inversion. Thus, according to a string of the data of the spread code, the spread modulation is performed by inverting or non-inverting the phase of the inputted signal.

Similarly, with respect to a receiving side, when the despread control signal is "1", an output of the OR gate becomes the fixed value "1", and the diodes D1 and D2 become continuous all the time. As a result, the FM narrowband signal is inputted into the despread modulating part 2-3 and then outputted therefrom without being despread.

When the despread control signal is "0", the output of the OR gate varies with the despread code. In a case in which the output of the OR gate is "1", the diodes D1 and D2 become continuous, and the FM narrowband signal is inputted into the despread modulating part 2-3 and then outputted herefrom without a phase inversion, whereas in a case in which the output of the OR gate is "0", the diodes D3 and D4 become continuous, and the FM narrowband signal is inputted into the despread modulating part 2-3 and then outputted therefrom with the phase inversion. Thus, according to a string of the data of the despread code, the despread modulation is performed by inverting or non-inverting the phase of the input spread signal.

Figure 10:
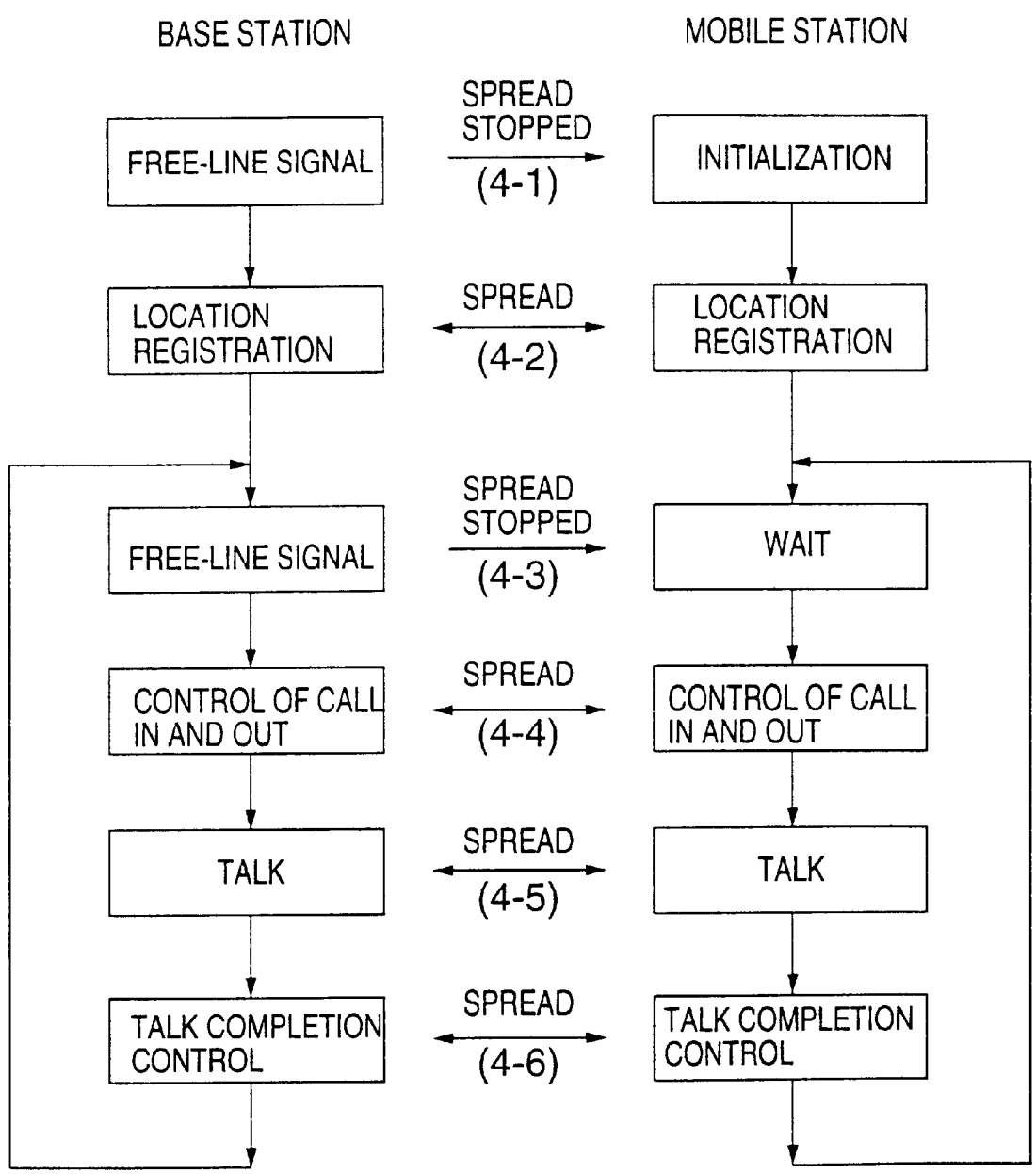
FIG. 10 is a flowchart of controlling a connection between a base station and a mobile station according to the present invention.

FIG. 10 is a flowchart of controlling a connection between the base station and the mobile station according to the present invention. The base station stops a spread modulation so as to transmit a free-line signal (4-1). The free-line signal is a signal for transmitting a message in a broadcast mode which message notifies that the base station is in a state of being able to receive a call-out request from the mobile station. In a case in which the free-line signal is not transmitted, it means that the connection line is busy and the mobile station cannot send the call-out request.

A location registration request from the mobile station is sent to the base station by modulating and spreading a location registration signal (4-2). After requesting the location registration, the mobile station stops the despread modulation so as to receive the free-line signal from the base station and at the same time waits to receive the call-in signal from the base station.

When the call-in signal from the base station and the call-out signal from the mobile station are generated, the two signals are controlled (i.e., call-out-and-call-in control) between the base station and the mobile station by transmitting and receiving the modulated-and-spread signal (4-4). After completing the call-out-and-call-in control, a line between the base station and the mobile station is connected, and a talk signal can be transmitted and received between the base station and the mobile station by the modulate-and-spread signal (4-5).

When the talk is completed, a talk-completion control is performed by transmitting and receiving a talk-completion control signal which signal is modulated-and-spread between the base station and mobile station (4-6). After the talk, the mobile station stops the despread modulation and is in a wait state.

Figure 11:
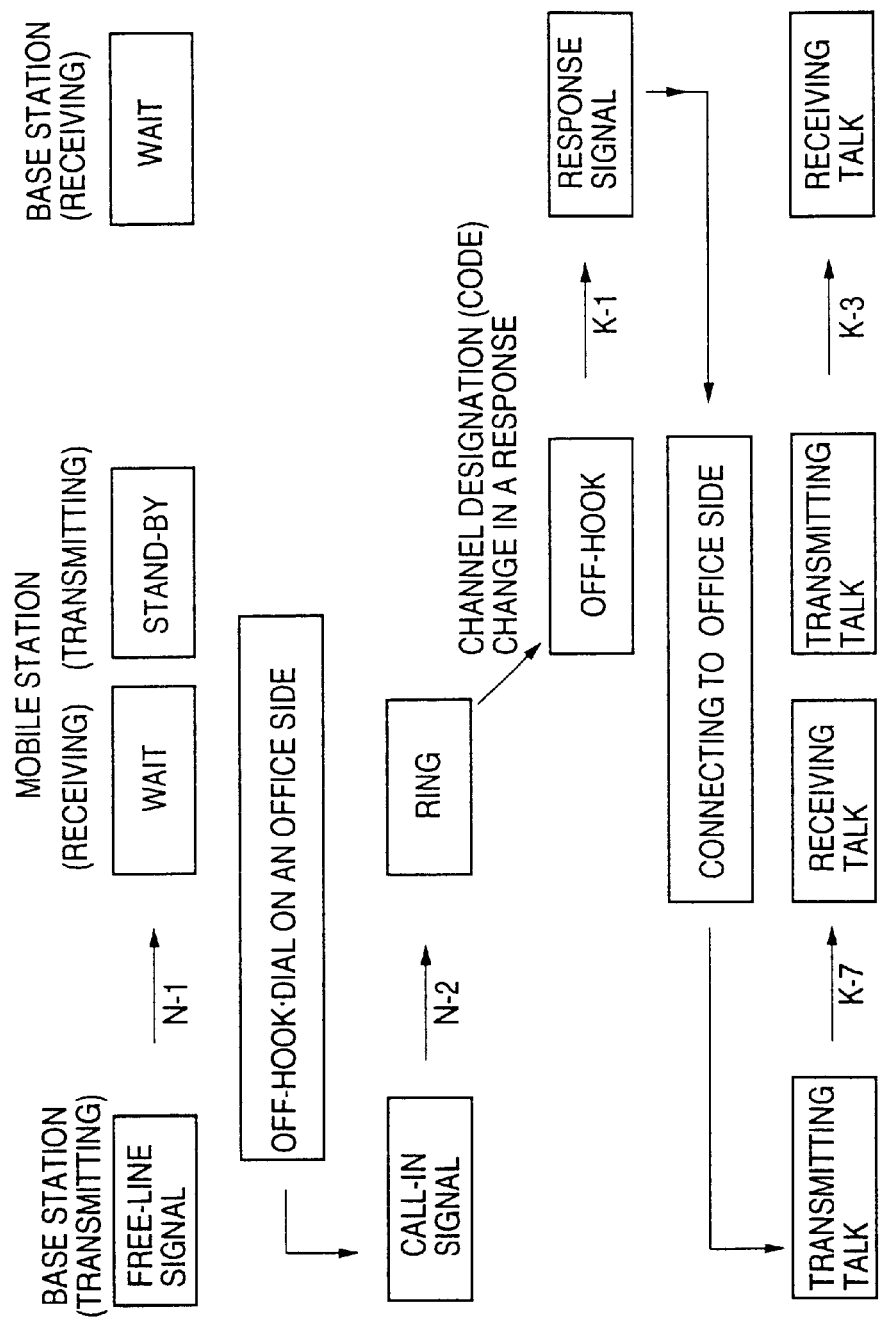
FIG. 11 is a block diagram of transmitting and receiving operations of a mobile station in a call-in according to the present invention.

FIG. 11 is a block diagram of transmitting and receiving operations of the mobile station in a call-in state according to the present invention. In this diagram, reference character N denotes a signal transmitted in a state in which the spread/despread modulation has been stopped, and K a signal transmitted while the spread/despread modulation is being performed.

In a state of stopping the despread modulation (N-1), the receiver of the mobile station receives the free-line signal transmitted from the base station, and at the same time waits to receive the call-in signal from the base station. At this time, the transmitter of the mobile station is in a stand-by state.

In an office side, when another telephone sends a call-out signal (i.e., sends an off-hook, or a dial signal) to the mobile station, the base station sends the call-in signal to the mobile station in a state of stopping the spread modulation. When receiving the call-in signal from the base station, the mobile station notifies a user by a calling signal (ring).

When the user responds to the call signal (i.e., off-hook), the transmitter of the mobile station changes a channel designation code, and modulates, spreads and then transmits a response signal (K-1) to the base station. Thereafter, the mobile station transmits a modulated-and-spread signal for controlling a line connection with the base station and then is connected to the office.

After that, the receiver of the mobile station receives a talk signal transmitted from the base station by despreading and demodulating the talk signal (k-2), and further the transmitter of the mobile station modulates, spreads, and then transmits the talk signal (k-3).

Figure 12:
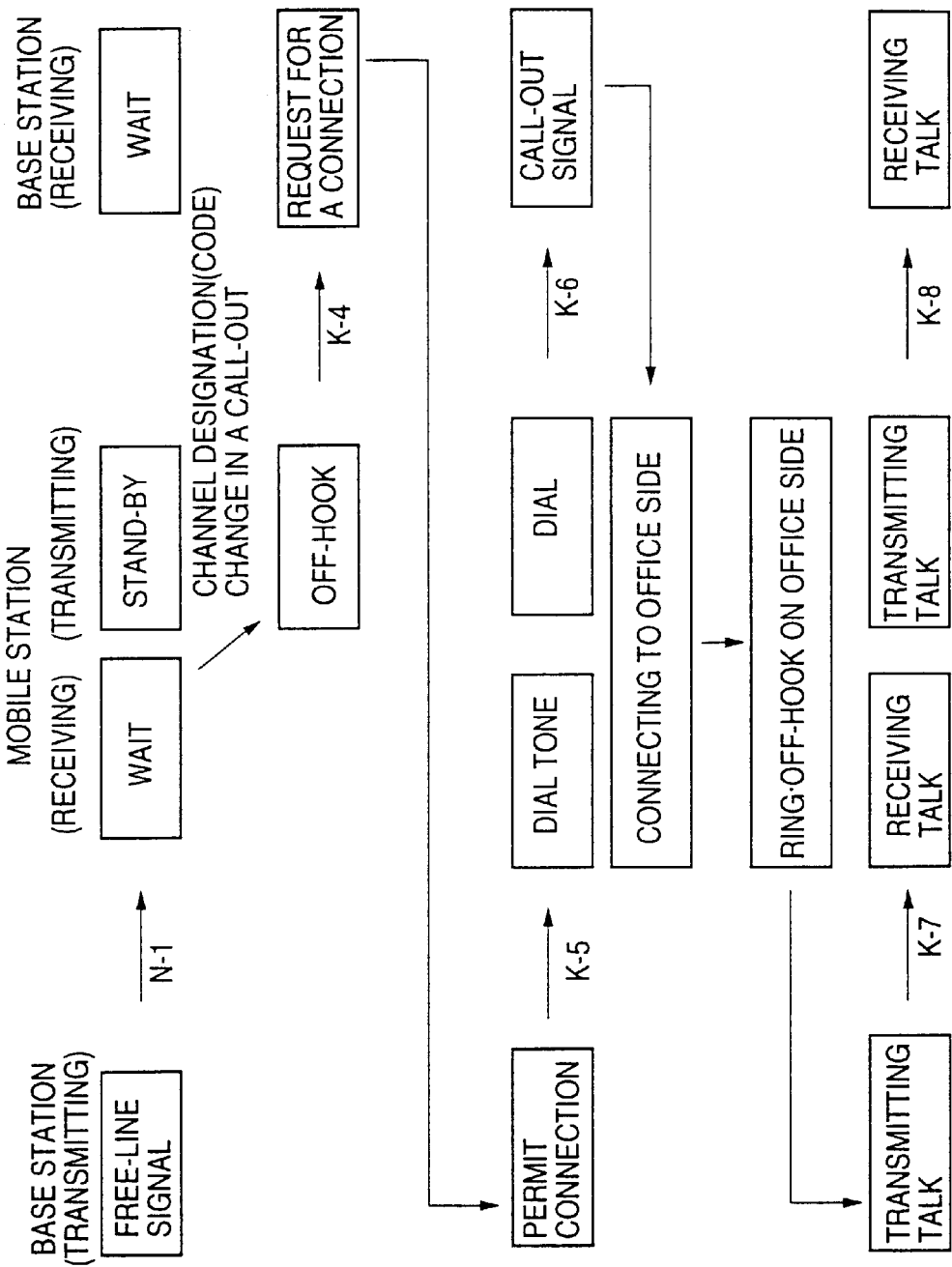
FIG. 12 is a block diagram of transmitting and receiving operations of the mobile station in a call-out according to the present invention.

FIG. 12 is a block diagram of transmitting and receiving operations of the mobile station in the call-out state according to the present invention.

In a state of stopping the despread modulation (N-1), the receiver of the mobile station receives the free-line signal transmitted from the base station, and at the same time waits to receive the call-in signal from the base station. At this time, the transmitter of the mobile station is in a stand-by state.

When the user sets the mobile station in a off-hook state and sends the call-out signal, the mobile station switches to a channel designation code used in the call-out, transmits an off-hook signal to the base station after modulating and spreading the off-hook signal (k-4), so as to establish a call connection. Thereafter, the mobile station receives a connection enabling signal from the base station after despreading and demodulating the connection enabling signal (k-5), and then sends a dial tone to the user.

When the user receives the dial tone and the dials, the mobile station transmits a dial signal to the base station after modulating and spreading the dial signal (k-6). Thereafter, when the office side detects that a calling signal has been transmitted to a called partner (i.e., a ring) and the called partner has responded to the calling signal (i.e., an off-hook), a line between the mobile station and the called partner is connected. The receiver of the mobile station receives a talk signal from the called partner after despreading and demodulating the talk signal (K-7), and then the transmitter of the mobile station transmits a talk signal of the mobile station after modulating and spreading the talk signal.

FIG. 13 shows a table of data on consumed current and consumed power of each block of the receiver of the mobile station. In this diagram, an analog portion is a block consisting of the receiving baseband processing part 2-1, the baseband demodulating part 2-2, the despread modulating part 2-3 and the high-frequency amplifying part 2-4.

A digital portion is a block consisting of the despread-code generating part 2-6 and the despread control part 2-7, each part being mainly formed of the gate circuits. A digital analog portion is a block consisting of the local-receiving-frequency generating part 2-5.

In the data shown in FIG. 13, the digital portion is formed of one thousand gate circuits as an example. The data is used for making a comparison among the analog portion, the digital portion, and the digital analog portion with regard to the consumed powers and the consumed currents of their basic operations, their intermittent operations, and their intermittent operations with despread stops.

It is clear from the data of FIG. 13 that the consumed current and consumed power of the digital portion occupy the majority of the overall consumed currents and consumed powers, but become nearly "0", when the despread modulation is stopped. For this reason, the total consumed power of the intermittent operations was 127 mW, whereas the total consumed power of the intermittent operations with despread stops was 6.5 mW. In other words, the consumed power was drastically reduced nearly to one twentieth.

The above description is provided in order to enable any person skilled in the art to make and use the invention and sets forth the best mode contemplated by the inventions of carrying out their invention.

The present invention is not limited to the specifically disclosed embodiment, and variations and modifications may be made without departing from the scope of the present invention.

The present application is based on Japanese priority application No. 11-041783 filed on Feb. 19, 1998, the entire contents of which are hereby incorporated for reference.

What is claimed is:

1. A method for spread spectrum communications between a base station and a mobile station, said method comprising the steps of:
   (a) controlling a transmitter of said base station to stop a spread modulation so as to transmit a free-line signal and a call-in signal to said mobile station which is in a wait state of waiting to receive said signals;
   (b) controlling a receiver of said mobile station to stop a despread modulation in said wait state of said mobile station so as to receive said free-line signal and said call-in signal from said base station; and (c) controlling said transmitter to modulate, spread, and then transmit and the receiver to receive and then despread and demodulate:

a control signal for connecting a line after transmitting and receiving said call-in signal are completed;

a control signal for connecting said line when a call-out request is sent from said mobile station; and a communication information signal and a communication-completion control signal which are transmitted and received through said line.

2. A transmitter of a base station for spread spectrum communications, comprising:

a baseband modulating part;

a spread modulating part;

a spread-code generating part; and a spread control part;

wherein said spread control part stops a spread modulation so as to transmit a free-line signal and a call-in signal which are outputted from said baseband modulating part, and controls said spread modulating part so as to spread modulate and then transmit to a mobile station which is in a wait state at least one of:

a control signal for connecting a line after transmitting said call-in signal is completed;

a control signal for connecting said line when a call-out request is sent from said mobile station; and a communication information signal and a communication-completion control signal which are to be transmitted through said line.

3. The transmitter as claimed in claim 2, wherein said baseband modulating part is capable of performing a narrowband frequency modulation, and said spread modulating part is capable of performing a direct sequence spread modulation by a spread code.

4. The transmitter as claimed in claim 2, wherein said baseband modulation part is capable of performing a digital phase modulation, and said spread modulating part is capable of performing a direct sequence spread modulation by a spread code.

5. A receiver of a mobile station for spread spectrum communications, comprising:

a baseband demodulating part;

a despread modulating part;

a despread-code generating part; and a despread control part;

wherein, when said mobile station is in a wait state, said despread control part stops a despread modulation so as to receive by said baseband demodulating part a non-spread call-in signal being used for call-in detection, and controls said despread modulating part so as to receive by said despread modulating part and said baseband demodulating part at least one of:

a control signal for connecting a line after receiving said non-spread call-in signal is completed;

a control signal for connecting said line when a call-out request is sent from said mobile station; and a communication information signal and a communication-completion control signal which are transmitted through said line.

6. The receiver as claimed in claim 5, wherein said baseband demodulating part is capable of demodulating a narrowband FM signal and said despread demodulating part is capable of performing a direct sequence despread modulation by a despread code.

7. The receiver as claimed in claim 5, wherein said baseband demodulating part is capable of demodulating a digital phase modulated signal, and said spread modulating part is capable of performing a direct sequence despread modulation by a despread code.

* * * * *